Figure 1:
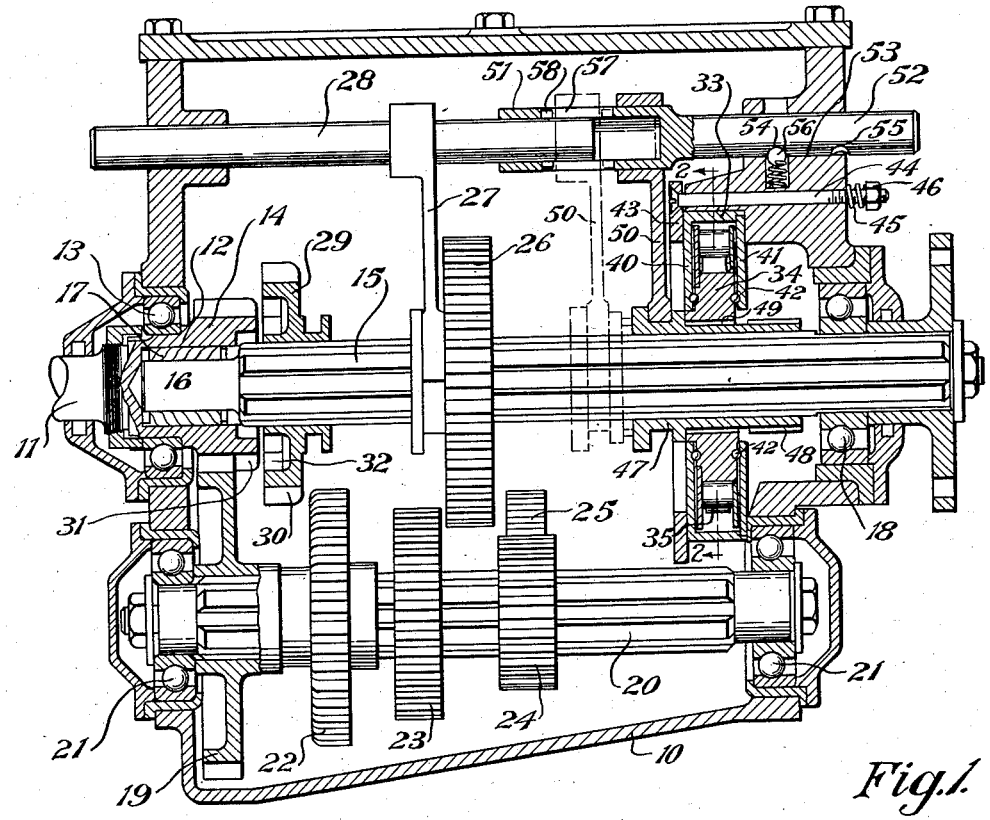

Jan. 21, 1936.   C. F. HAHN   2,028,205

AUTOMATIC AUTOMOBILE BRAKE

Filed March 25, 1933   2 Sheets-Sheet 1

INVENTOR
Clair F. Hahn
BY
Frease and Bishop
ATTORNEYS

Jan. 21, 1936.  C. F. HAHN  2,028,205
AUTOMATIC AUTOMOBILE BRAKE
Filed March 25, 1933  2 Sheets-Sheet 2

INVENTOR
Clair F. Hahn
BY
Frease and Bishop
ATTORNEYS

Patented Jan. 21, 1936

2,028,205

UNITED STATES PATENT OFFICE 2,028,205

AUTOMATIC AUTOMOBILE BRAKE

Clair F. Hahn, Alliance, Ohio

Application March 25, 1933, Serial No. 662,655

10 Claims. (Cl. 192—4)

The invention relates to automobile brakes and more particularly to an automatic brake associated with the transmission mechanism of a motor vehicle for automatically preventing retrograde movement of the vehicle when the same is stopped upon an inclined roadway.

It is well known that many attempts have been made to produce brakes for automatically preventing retrograde movement of a motor vehicle but in such devices the brake is released only when the transmission mechanism is shifted to reverse. As it is sometimes desirable or necessary to manually push an automobile backward, such devices are objectionable since the automatic brake is released only when the transmission gears are shifted to reverse position, and it is difficult, if not impossible, to manually push a motor vehicle when the same is in gear.

The object of the present improvement is to provide an automatic brake for preventing backward movement of an automobile when the transmission mechanism is shifted to first or low speed, and arranged to remain in operative position as the transmission is shifted to neutral or any higher speed, but arranged to be automatically released as the transmission mechanism is shifted to reverse and to remain released when shifted from reverse to neutral.

The above and other objects may be accomplished by providing a hub longitudinally slidably splined upon the transmission or drive shaft and provided at one end portion with peripheral teeth adapted to engage an internally toothed portion of an inner race member of an overrunning clutch, the outer race member of which is normally held against movement; means operatively connecting said slidable hub with one of the usual shifting rods of the transmission mechanism whereby the toothed portion of the hub is engaged with the toothed portion of said inner race member when the transmission mechanism is shifted to low or first speed and will remain engaged until the transmission is shifted to reverse position, which will automatically disengage the toothed portion of the hub from the toothed portion of the inner race member, these parts remaining disengaged until the transmission mechanism is again shifted to low or first speed.

The invention further contemplates frictional means for normally holding the outer race member against rotation under ordinary operating conditions but permitting rotation thereof under any sudden or undue strain such as might be caused by shifting to low or first speed while the vehicle is moving backward, in order to prevent destruction of or injury to the transmission mechanism.

Figure 2:
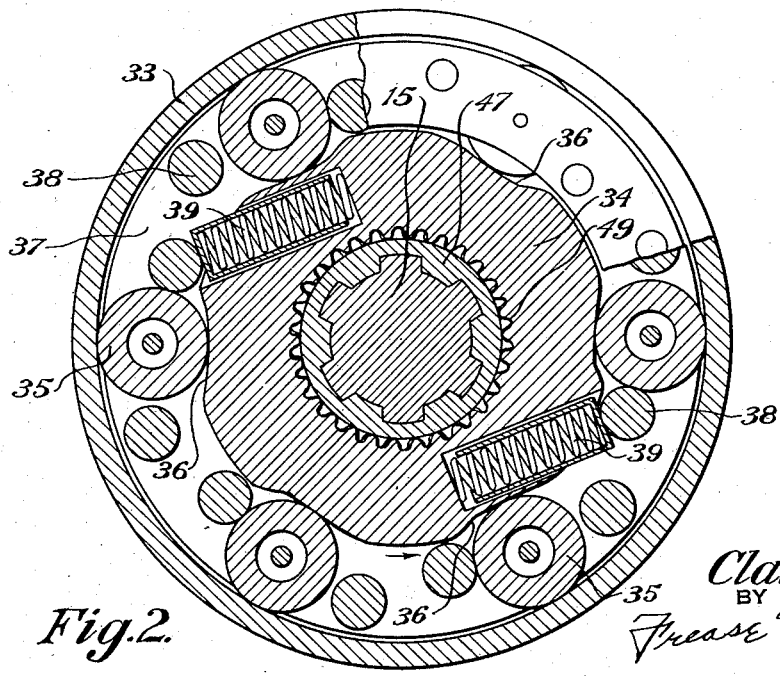
Figure 3:
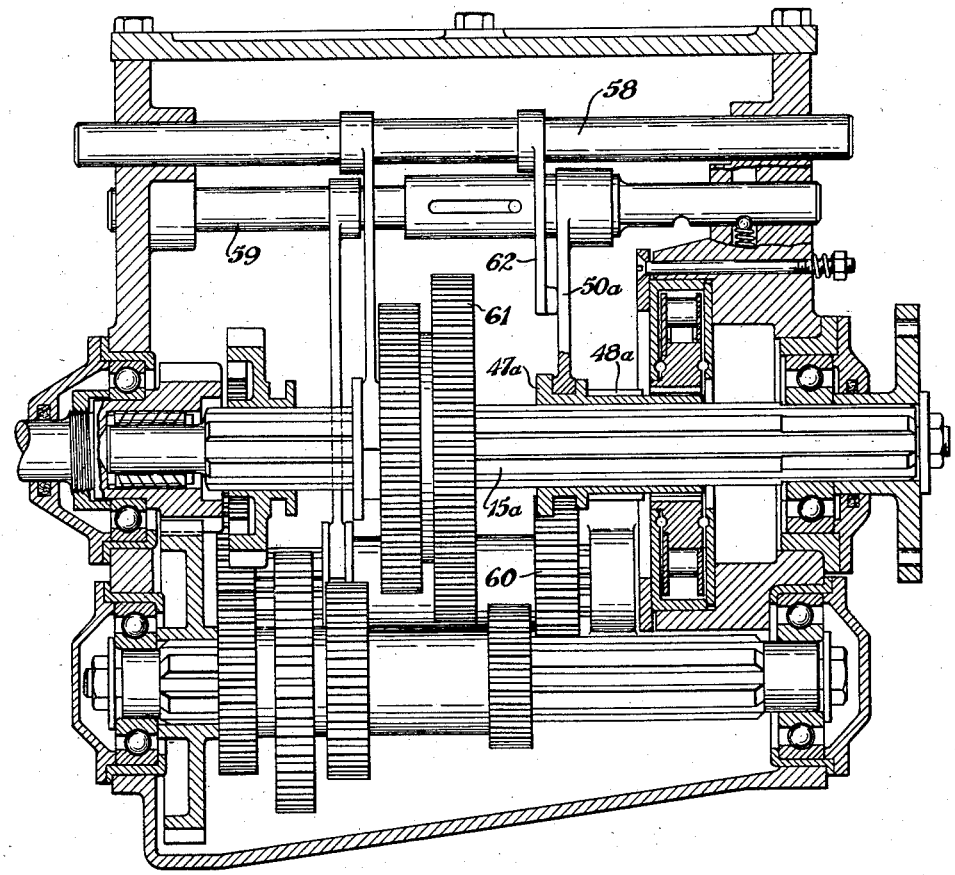

An embodiment of the invention is illustrated in the accompanying drawing, in which Figure 1 is a vertical longitudinal sectional view through a transmission gear housing of an automobile showing the adaptation of the invention thereto;

Fig. 2, an enlarged transverse sectional view showing the automatic brake, taken as on the line 2—2, Fig. 1; and Fig. 3, a view similar to Fig. 1, showing a transmission having four speeds forward.

Similar numerals refer to similar parts throughout the drawings.

In the accompanying drawings the invention is illustrated as applied to a conventional form of gear transmission mechanism having three speeds forward and one reverse, but as will later be explained, the invention is equally well adapted to transmissions having four or five forward speeds.

The automatic brake to which the invention pertains may be located within the usual transmission gear box or housing 10, as illustrated in the drawing, or if desired, may be located outside of said box without in any manner changing the principle of the operation of the same.

The usual clutch shaft is shown at 11 extending into the forward end of the transmission housing 10 and having the hollow end portion 12 journaled therein as by the ball bearing 13, the usual stem gear or pinion 14 being fixed upon the rear end portion of said clutch shaft.

The splined drive shaft or transmission shaft 15 has the journal portion 16 at its forward end journaled within the hollow rear end of the clutch shaft as by the roller bearing 17, the rear end portion of said drive shaft being journaled through the rear end of the transmission housing as by the ball bearing 18.

The pinion 14 is in constant mesh with a gear 19 fixed upon the countershaft 20 which is journaled in the gear housing 10 below and parallel to the splined drive shaft 15, as by the ball bearings 21 in opposite ends of the gear housing. The second speed gear 22, low or first speed gear 23 and reverse gear 24 are all fixed upon the countershaft 20, said reverse gear meshing with the reverse idler gear 25 which is journaled upon a second countershaft (not shown), as in usual and ordinary practice.

The sliding gear 26 is slidably splined upon the shaft 15 and adapted to be moved into mesh with the low gear 23 or reverse idler gear 25 as by means of the shifter fork 27 carried by the shifter rod 28. A second sliding gear 29 is splined upon the shaft 15 and adapted to be slidably moved by a similar shifter fork and shifter rod (not shown), to engage the second speed gear 22 by the external teeth 30 upon said shifter gear or to engage the direct drive high speed clutch portion 31 of the pinion 14 by the internal teeth 32. This much of the transmission mechanism may be of any usual and well known construction and arrangement and in itself forms no part of the present invention.

The automatic brake to which the invention pertains is in the form of an overrunning clutch which includes the outer race member 33 and the spaced inner race member 34 between which are located the rollers 35. The inner race member 34 is provided around its periphery with inclined notches or pockets 36 corresponding in number and position to the rollers, one roller being positioned in each pocket. These rollers may be carried in a cage comprising the spaced rings 37 connected by the studs or tiebars 38.

For the purpose of normally holding the rollers 35 up toward the high points of the notches or pockets 36, one or more springs 39 may be carried by the inner race member 34 for engagement with adjacent studs or tie bars 38 of the cage. When the inner race member 34 is rotated in the direction of the arrow in Fig. 2, the rollers 35 will move backward, against the tension of the springs 39, into the low points of the notches 36, permitting the inner race member to rotate freely, the rollers riding around the interior of the outer race member.

It will be seen, however, that when it is attempted to rotate the inner race member 34 in the opposite direction, the rollers 35 will immediately ride up upon the high points of the notches 36, wedging themselves between the inner and outer race members and locking the two race members together so as to prevent movement of the inner race member 34 relative to the outer race member 33.

The parts may be assembled together by means of the annular flange 40 upon one side of the outer race member and the ring plate 41 upon the other side thereof, extending down over opposite sides of the inner race member 34. Raceways may be formed in opposite sides of the inner member 34 and the adjacent faces of the flange 40 and ring plate 41 to receive antifriction balls 42 whereby the inner race member may freely rotate upon ball bearings.

The outer race member 33 may be held against rotation in any suitable manner and, as shown in Fig. 1, this member may be normally held against rotation by frictional means such as the ring 43 and bolts 44 located through the rear end wall of the gear housing and provided with strong springs 45 located between the gear housing and the nuts 46 upon the bolts, whereby the outer race member is prevented from rotating under normal conditions and at the same time permitted to rotate if any undue or sudden strain or shock is placed upon the same.

A hub 47 is slidably splined upon the shaft 15 and provided at its rear end portion with the teeth 48 adapted to engage the internal teeth 49 in the inner race member 34. The hub 47 is adapted to be slidably moved upon the shaft 15 as by means of a fork 50 adapted to be operatively connected to the shifter rod 28 by any suitable means which will permit of a certain amount of lost motion between the shifter rod and fork.

This means may be as shown in Fig. 1 in which the rear end of the shifter rod 28 is slidably mounted within a tubular portion or sleeve 51 in the forward end portion of a short rod 52 slidably located through a bearing 53 in the rear wall of the transmission box and provided with spaced notches 54 and 55 adapted to be alternately engaged by the spring pressed ball 56 for temporarily locking the rod 52 in either of two positions.

The tubular portion or sleeve 51 is provided with one or more elongated slots 57 within which is received a stud 58 carried by the shifter rod 28 permitting a differential movement between the shifter rod and the fork 50 substantially equal to the length of the slot 57.

Assuming the parts are in the position shown in Fig. 1, the transmission mechanism is shown as having been shifted to neutral position from reverse, the teeth 48 of the hub 47 being disengaged from the internal teeth 49 of the inner race member, the automatic brake being thus released so that the vehicle may be moved backward.

In starting the automobile, from the position shown in Fig. 1, the shifter rod 28 will be slidably moved forward, or to the left as viewed in said figure, by means of the usual gear shift lever (not shown), sliding the gear 26 forward upon the splined drive shaft 15 and into engagement with the low or first speed gear 23, the stud 58 being in contact with the forward or left end of the groove 57 whereby the fork 50 will be slidably moved forward or to the left to the position shown in broken lines in Fig. 1, sliding the hub 47 upon the shaft 15 and moving the teeth 48 upon the rear or right end thereof into engagement with the internal teeth 49 within the inner race member 34. With the parts in this position it will be seen that the automatic brake is in operative condition so as to prevent any backward movement of the vehicle.

It will be apparent that the instant the vehicle starts to move backward the shaft 15 will be rotated in reverse direction, rotating the inner race member 34 therewith and causing the rollers 35 to ride up on the high points of the notches or pockets 36, tightly wedging the rollers between the inner and outer race members and locking the car against backward movement.

When the gears are shifted from low or first speed to neutral, the shifter rod 28 will be slidably moved backward, or to the right as viewed in Fig. 1, moving the sliding gear 26 out of engagement with the low gear 23 but the fork 50 and hub 47 will remain in the broken line position shown in Fig. 1 because the stud 58 upon the shifter rod 28 will merely slide rearward or toward the right in the slot 57. The automatic brake will still remain in operative position to prevent retrograde movement of the vehicle.

When the gears are shifted to second speed or high speed, by moving the sliding gear 29 into engagement with the second speed gear 22 or high speed gear or clutch 31, by means of the shifter rod usually provided for such purpose (not shown), the fork 50 and hub 47 will not be moved, thus remaining in position to hold the automatic brake in operative condition so as to prevent backward movement of the vehicle, and the brake will remain in this condition until the gears are again shifted to reverse position, at which time the stud 58 upon the shifter rod 28, being at the rear or right-hand end of the slot 57, will move the fork 50, and with it the hub 47, back to the full line position shown in Fig. 1, disengaging the teeth 48 of the hub from the teeth 49 of the inner race member, placing the automatic brake in the inoperative condition so that the vehicle may be pushed backward manually.

It will be understood that the hub 47 will remain in this disengaged position until the gears are again shifted to low or first speed. It will thus be obvious that the automatic brake is placed in operative condition only by shifting the gears to first or low speed and will remain in this condition until the gears are shifted to reverse, at which time the automatic brake is rendered inoperative and will remain so until the gears are again shifted to first or low speed.

When the hub 47 is in the disengaged position, with the automatic brake inoperative, as shown in Fig. 1, the rod 52 will be held against accidental movement by engagement of the spring pressed ball 56 in the notch 54 of the rod and when the hub is in the engaged position, rendering the automatic brake operative, as indicated in broken lines in Fig. 1, the rod 52 will be held against accidental movement by engagement of the spring pressed ball 56 in the notch 55.

Although the drawings illustrate the invention as applied to the conventional gear transmission having three speeds forward, it should be understood that it is equally well adapted to transmissions having four or five speeds forward. In a transmission having either four or five speeds forward when the low speed and reverse are operated by the same shifting rod, the construction and arrangement of the automatic brake and the operating parts therefor will be identically the same as shown in Fig. 1.

The usual transmission having four speeds forward as shown in Fig. 3 has the first and second speeds operated by one shifting rod 58, the third and fourth speeds by a second shifting rod and the reverse by a third shifting rod 59 which usually shifts forward or to the left as viewed in Fig. 3 in order to engage the sliding gear 60 with the gear 61, this being just the opposite to the movement of the rod 28 and sliding gear 26, as shown in Fig. 1, to engage the reverse idler gear 25.

In order to accommodate this four speed transmission, the hub 47a is mounted upon the shaft 15a in reverse position to that shown in Fig. 1, or the teeth 48a may be on the other end of the hub as shown in Fig. 3, so that the hub will move rearward to engage the teeth of the hub with the teeth of the inner race member and move forward to disengage therefrom and the hub 47a can be operatively connected to the reverse shifter rod 59 by a fork 50a in the same manner in which it is shown in Fig. 1 operatively connected to the shifter rod 28, while a shoulder or finger 62 carried by the shifter rod 58 operating the first and second speed gears would be arranged to contact with the fork 50a to slidably move the hub 47a into the engaged or operative position.

I claim:

1. A transmission mechanism including a drive shaft, shifter rod means for causing a reverse rotation of said shaft and forward rotation of the shaft at several speeds including a low speed and for shifting to a neutral position from each of said reverse and forward speeds, an automatic brake for preventing reverse rotation of said shaft and comprising an overrunning clutch including a normally stationary outer race member and an inner race member rotatable therein and surrounding the drive shaft, a sleeve slidably splined upon the drive shaft and adapted to lock said inner race member to the drive shaft and means operatively associated with said sleeve and operatively associated with the shifter rod means so as to permit a certain amount of lost motion between said means and the shifter rod means for moving said sleeve to locking position when the shifter rod means is shifted to low speed and for moving said sleeve to unlocking position when the shifter rod means is shifted to reverse and for retaining the sleeve in unlocked position when the shifter rod means is shifted to neutral from reverse.

2. A transmission mechanism including a drive shaft, shifter rod means for causing a reverse rotation of said shaft and forward rotation of the shaft at several speeds including a low speed and for shifting to a neutral position from each of said reverse and forward speeds, an automatic brake for preventing reverse rotation of said shaft and comprising an overrunning clutch including a normally stationary outer race member and an inner race member rotatable therein and surrounding the drive shaft, a sleeve slidably splined upon the drive shaft and adapted to lock said inner race member to the drive shaft and a fork slidably connected with the shifter rod means for moving said sleeve to locking position when the shifter rod means is shifted to low speed and for moving said sleeve to unlocking position when the shifter rod means is shifted to reverse and for retaining the sleeve in unlocked position when the shifter rod means is shifted to neutral from reverse.

3. A transmission mechanism including a drive shaft, shifter rod means for causing a reverse rotation of said shaft and forward rotation of the shaft at several speeds including a low speed and for shifting to a neutral position from each of said reverse and forward speeds, an automatic brake for preventing reverse rotation of said shaft and comprising an overrunning clutch including a normally stationary outer race member and an inner race member rotatable therein and surrounding the drive shaft and provided with internal teeth, a sleeve slidably splined upon the drive shaft and provided with teeth for engaging the internal teeth of the inner race member, and a fork operatively associated with said sleeve and operatively associated with the shifter rod means so as to permit a certain amount of lost motion between the fork and the shifter rod means for moving said sleeve to engage the teeth thereon with said internal teeth when the shifter rod means is shifted to low speed and for disengaging said teeth when the shifter rod means is shifted to reverse and for retaining said teeth in disengaged position when the shifter rod means is shifted to neutral from reverse.

4. A transmission mechanism including a drive shaft, shifter rod means for causing a reverse rotation of said shaft and forward rotation of the shaft at several speeds including a low speed and for shifting to a neutral position from each of said reverse and forward speeds, an automatic brake for preventing reverse rotation of said shaft and comprising an overrunning clutch including a normally stationary outer race member and an inner race member rotatable therein and surrounding the drive shaft, a sleeve slidably splined upon the drive shaft and adapted to lock said inner race member to the drive shaft, and a fork operatively associated with the sleeve and slidably connected with the shifter rod for moving said sleeve to locking position when the shifter rod is shifted to low speed and for moving said sleeve to unlocking position when the shifter rod is shifted to reverse and for retaining the sleeve in unlocked position when the shifter rod is shifted to neutral from reverse.

5. In a transmission mechanism including a drive shaft, shifter rod means for causing a reverse rotation of said shaft and forward rotation of the shaft at several speeds including a low speed and for shifting to a neutral position from each of said reverse and forward speeds, an automatic brake for preventing reverse rotation of said shaft and comprising an overrunning clutch including an outer race member and an inner race member rotatable therein and surrounding the drive shaft, friction means for normally preventing rotation of the outer race member but permitting the same to rotate if undue or sudden strain or shock is placed thereon, means for slidably locking the inner race member upon the drive shaft, and a fork slidably associated with the shifter rod means for rendering the brake operative when the shifter rod means is shifted to low speed and for rendering the brake inoperative when the shifter rod means is shifted to reverse and for retaining the brake in inoperative position when the shifter rod means is shifted to neutral from reverse.

6. A transmission mechanism including a drive shaft, shifter rod means for causing a reverse rotation of said shaft and forward rotation of the shaft at several speeds including a low speed and for shifting to a neutral position from each of said reverse and forward speeds, an automatic brake for preventing reverse rotation of said shaft and comprising an overrunning clutch including a normally stationary outer race member and an inner race member rotatable therein and surrounding the drive shaft, friction means for normally preventing rotation of the outer race member but permitting the same to rotate if undue or sudden strain or shock is placed thereon, a sleeve slidably splined upon the drive shaft and adapted to lock said inner race member to the drive shaft, and means operatively associated with the shifter rod means for moving said sleeve to locking position when the shifter rod means is shifted to low speed and for moving said sleeve to unlocking position when the shifter rod means is shifted to reverse and for retaining the sleeve in unlocked position when the shifter rod means is shifted to neutral from reverse.

7. In a transmission mechanism including a drive shaft, shifter rod means for causing a reverse rotation of said shaft, shifter rod means for causing forward rotation of the shaft, an automatic brake for preventing reverse rotation of said shaft, a fork operatively associated with the reverse shifter rod means for rendering the brake inoperative when said reverse shifter rod means is operated to reverse and to neutral positions, and means upon the forward shifting rod means for engagement with said fork for rendering the brake operative when the forward shifter rod means is shifted to forward position.

8. A transmission mechanism including a drive shaft, shifter rod means for causing a reverse rotation of said shaft and forward rotation of the shaft at several speeds including a low speed and for shifting to a neutral position from each of said reverse and forward speeds, an automatic brake for preventing reverse rotation of said shaft and comprising an overrunning clutch including a normally stationary outer race member and an inner race member rotatable therein and surrounding the drive shaft, friction means for normally preventing rotation of the outer race member but permitting the same to rotate if undue or sudden strain or shock is placed thereon, a sleeve slidably splined upon the drive shaft and adapted to lock said inner race member to the drive shaft, and means including a stud upon the shifter rod means and a slot in the sleeve for moving said sleeve to locking position when the shifter rod means is shifted to low speed and for moving said sleeve to unlocking position when the shifter rod means is shifted to reverse and for retaining the sleeve in unlocked position when the shifter rod means is shifted to neutral from reverse.

9. A transmission mechanism including a drive shaft, shifter rod means for causing a reverse rotation of said shaft and forward rotation of the shaft at several speeds including a low speed and for shifting to a neutral position from each of said reverse and forward speeds, an automatic brake for preventing reverse rotation of said shaft and comprising an overrunning clutch including a normally stationary outer race member and an inner race member rotatable therein and surrounding the drive shaft, friction means for normally preventing rotation of the outer race member but permitting the same to rotate if undue or sudden strain or shock is placed thereon, a sleeve slidably splined upon the drive shaft and adapted to lock said inner race member to the drive shaft, and means upon the shifter rod means and sleeve including a slot in one of said members and a stud in the other member for moving said sleeve to locking position when the shifter rod means is shifted to low speed and for moving said sleeve to unlocking position when the shifter rod means is shifted to reverse and for retaining the sleeve in unlocked position when the shifter rod means is shifted to neutral from reverse.

10. A transmission mechanism including a drive shaft, shifter rod means for causing a reverse rotation of said shaft and forward rotation of the shaft at several speeds including a low speed and for shifting to a neutral position from each of said reverse and forward speeds, an automatic brake for preventing reverse rotation of said shaft and comprising an overrunning clutch including a normally stationary outer race member and an inner race member rotatable therein and surrounding the drive shaft, friction means for normally preventing rotation of the outer race member but permitting the same to rotate if undue or sudden strain or shock is placed thereon, a sleeve slidably splined upon the drive shaft and adapted to lock said inner race member to the drive shaft, and means including a stud on the shifter rod means for engaging said sleeve for moving said sleeve to locking position when the shifter rod means is shifted to low speed and for moving said sleeve to unlocking position when the shifter rod means is shifted to reverse and for retaining the sleeve in unlocked position when the shifter rod means is shifted to neutral from reverse.

CLAIR F. HAHN.